United States Patent
Naito et al.

(10) Patent No.: US 9,704,652 B2
(45) Date of Patent: Jul. 11, 2017

(54) METHOD FOR MANUFACTURING TUNGSTEN-BASED CAPACITOR ELEMENT

(71) Applicant: SHOWA DENKO K.K., Tokyo (JP)

(72) Inventors: Kazumi Naito, Tokyo (JP); Katsutoshi Tamura, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 15/306,233

(22) PCT Filed: Jan. 20, 2015

(86) PCT No.: PCT/JP2015/051327
§ 371 (c)(1),
(2) Date: Oct. 24, 2016

(87) PCT Pub. No.: WO2015/166670
PCT Pub. Date: Nov. 5, 2015

(65) Prior Publication Data
US 2017/0047169 A1 Feb. 16, 2017

(30) Foreign Application Priority Data

May 1, 2014 (JP) .................. 2014-094535

(51) Int. Cl.
*H01L 21/00* (2006.01)
*H01G 9/00* (2006.01)
(Continued)

(52) U.S. Cl.
CPC ............. *H01G 9/0032* (2013.01); *H01G 9/00* (2013.01); *H01G 9/04* (2013.01); *H01G 9/042* (2013.01); *H01G 9/052* (2013.01); *H01G 9/0525* (2013.01)

(58) Field of Classification Search
CPC .......... H01G 9/04; H01G 9/042; H01G 9/052; H01G 9/0525
See application file for complete search history.

(56) References Cited

U.S. PATENT DOCUMENTS

2009/0185330 A1  7/2009  Breznova et al.
2013/0277626 A1  10/2013 Naito
(Continued)

FOREIGN PATENT DOCUMENTS

JP  2006-108395 A   4/2006
JP  2007-273839 A  10/2007
(Continued)

OTHER PUBLICATIONS

International Search Report of PCT/JP2015/051327 dated Mar. 31, 2015 [PCT/ISA/210].

*Primary Examiner* — Richard Booth
(74) *Attorney, Agent, or Firm* — Sughrue Mion, PLLC

(57) ABSTRACT

The present invention provides a method for producing a capacitor element having good LC characteristics, wherein, after a chemical conversion process to form a dielectric layer on the surface layer of an anode body obtained by forming a powder mainly comprising tungsten, followed by sintering, a semiconductor layer and a conductor layer are sequentially formed on the dielectric layer; an etching process is conducted before forming the dielectric layer to remove a natural oxide film formed on the surface layer on the outer surface and on the surface inside the pores of the anode body so as to adjust the film thickness to a range of 0.5 to 5.0 nm; and the chemical conversion process is conducted at a temperature from −4 to 18° C. for 7 to 110 minutes after reaching a predetermined voltage.

7 Claims, 1 Drawing Sheet

(51) Int. Cl.
  *H01G 9/04*   (2006.01)
  *H01G 9/042*  (2006.01)
  *H01G 9/052*  (2006.01)

(56) References Cited

U.S. PATENT DOCUMENTS

2015/0340158 A1   11/2015  Naito et al.
2015/0371784 A1*  12/2015  Naito .................. H01G 9/0036
                                              29/25.03
2016/0336116 A1*  11/2016  Naito .................. H01G 9/0036

FOREIGN PATENT DOCUMENTS

JP     2009-177174 A    8/2009
WO     2012/086272 A1   6/2012
WO     2013/190756 A1   12/2013

* cited by examiner

METHOD FOR MANUFACTURING TUNGSTEN-BASED CAPACITOR ELEMENT

This application is a National Stage of International Application No. PCT/JP2015/051327 filed Jan. 20, 2015, claiming priority based on Japanese Patent Application No. 2014-094535 filed May 1, 2014, the contents of all of which are incorporated herein by reference in their entirety.

TECHNICAL FIELD

The present invention relates to a method for producing a tungsten-based capacitor element. Specifically, the present invention relates to a method for producing a tungsten electrolytic capacitor element that facilitates polymerization for forming a semiconductor layer serving as a cathode and that has improved leakage current (LC) characteristics.

BACKGROUND ART

With the progress of small-size, high-speed and light-weight electronic devices such as cellular phones and personal computers, the capacitor used for these electronic devices is demanded to have a smaller size, a lighter weight, a larger capacitance and a lower equivalent series resistance (ESR).

As an example of such a capacitor, an electrolytic capacitor has been proposed, which capacitor is produced by anodically oxidizing a sintered body (anode body) obtained by sintering valve-acting metal powder such as tantalum which can be anodized to form a dielectric layer made of the oxide of the metal on the surface of the sintered body.

The electrolytic capacitor using tungsten as a valve-acting metal and employing a sintered body of the tungsten powder as an anode body can attain a larger capacitance compared to the electrolytic capacitor obtained with the same formation voltage by employing an anode body of the same volume using the tantalum powder having the same particle diameter but have a problem of high leakage current (LC).

The present applicant found that the problem of the LC characteristics can be solved by using a tungsten powder comprising a specific amount of tungsten silicide in the particle surface region, and proposed a tungsten powder comprising tungsten silicide in the particle surface region and having a silicon content of 0.05 to 7 mass %; an anode body comprising the sintered body of the tungsten powder; an electrolytic capacitor; and a production method thereof (Patent Document 1; European Patent No. 2656947).

The above-mentioned tungsten electrolytic capacitor is manufactured by forming a dielectric layer on the surface layer of an anode body obtained by molding a powder mainly comprising tungsten, followed by sintering, and sequentially forming a semiconductor layer and a conductor layer on the dielectric layer. Here, a tungsten anode body before the formation of a dielectric layer is left in the air, a natural oxide film is likely to be formed on the surface of the anode body. Compared to electrolytic oxide films formed by chemical conversion, a natural oxide films are uneven in thickness and thus have inferior withstand voltage characteristics. Therefore, an etching process is conducted prior to the chemical conversion treatment process to form a dielectric layer on the anode body so as to entirely remove the natural oxide film having an uneven thickness present on the surface of the anode body in order to form a dielectric layer having an even thickness. However, cracks are generated in the dielectric layer in some cases depending on the thickness of the dielectric layer formed by the chemical conversion treatment, leading to a problem of an uneven thickness of the cathode layer (an organic semiconductor layer formed by polymerization) formed on the dielectric layer in a subsequent process, which causes deterioration in leakage current (LC) as a result.

As the prior art relevant to the etching method to remove a natural oxide film on the surface of the tungsten anode body, which method is employed in the present invention, for example, Patent Document 2 (JP 2009-177174 A (U.S. Pat. No. 7,768,773)) discloses a method of etching an oxide film on the surface of a niobium sintered body with an organic acid; Patent Document 3 (JP 2007-273839 A) discloses a method of etching an oxide film on the surface of an aluminum foil with a mixed solution of phosphoric acid and chromic acid; and Patent Document 4 (WO 2013/190756) discloses a method for entirely removing a natural oxide film by passing current through a tungsten anode body in an alkaline solution.

PRIOR ART

Patent Documents

Patent Document 1: WO 2012/086272 (European Patent No. 2656947)
Patent Document 2: JP 2009-177174 A (U.S. Pat. No. 7,768,773)
Patent Document 3: JP 2007-273839 A
Patent Document 4: WO 2013/190756

DISCLOSURE OF INVENTION

Problems to be Solved by the Invention

An objective of the present invention is to provide a method for producing a capacitor element capable of attaining in particular good LC characteristics in a capacitor element obtained by forming a dielectric layer on the surface layer of an anode body obtained by molding a powder mainly comprising tungsten, followed by sintering, and sequentially forming a semiconductor layer and a conductor layer on the dielectric layer.

Means to Solve the Problems

The present inventors have found that an anode body having low leakage current (LC) at a high voltage when the leakage current is measured using an electrolyte as a cathode and having a large capacitance can be obtained by conducting an etching process prior to the formation of a dielectric layer on the surface layer of a tungsten anode body by chemical conversion treatment so that a natural oxide film generated on the surface layer of the anode body is not removed completely but is left slightly. Further, the present inventors have found the chemical conversion treatment conditions such that cracks are not generated in the dielectric layer on the surface layer of the outer surface of the anode body and have accomplished the present invention.

The present invention relates to the method for producing a capacitor element according to [1] to [7] as described below.

[1] A method for producing a capacitor element, wherein, after a chemical conversion process to form a dielectric layer on the surface layer of an anode body obtained by forming a powder mainly comprising tungsten, followed by sintering, a semiconductor layer and a conductor layer are sequentially formed on the dielectric layer; an etching process is conducted before forming the dielectric layer to remove a natural oxide film formed on the surface layer on the outer surface of the anode body and on the surface inside the pores of the anode body so as to adjust the film thickness to a range of 0.5 to 5.0 nm; and the chemical conversion process is conducted at a temperature from −4 to 18° C. for 7 to 110 minutes after reaching a predetermined voltage.

[2] The method for producing a capacitor element as described in [1] above, wherein the etching process is conducted by bringing the anode body into contact with an alkaline solution without passing current.

[3] The method for producing a capacitor element as described in [2] above, wherein the alkali is sodium hydroxide or potassium hydroxide.

[4] The method for producing a capacitor element as described in [2] above, wherein the alkaline solution is an aqueous solution of sodium hydroxide or potassium hydroxide, or a solution of a mixed solvent of water and an organic solvent.

[5] The method for producing a capacitor element as described in [4] above, wherein the alkaline solution is an aqueous solution of 0.05 to 5 mass % sodium hydroxide.

[6] The method for producing a capacitor element as described in [2] above, wherein the anode body is brought into contact with the alkaline solution by spreading (spraying) or brushing.

[7] The method for producing a capacitor element as described in any one of [1] to [6] above, wherein the powder mainly comprising tungsten contains tungsten silicide only in the particle surface region and the silicon content in the whole tungsten powder is 0.05 to 7.0 mass %.

Effects of Invention

The present invention makes it possible to obtain a tungsten anode body subjected to chemical conversion treatment, which anode body has no crack in the dielectric layer on the outer surface of the anode body even when a thick dielectric layer is formed in the chemical conversion process. In addition, a tungsten electrolytic capacitor can be obtained, in which a capacitance is increased due to the improved impregnation of the cathode (organic semiconductor layer) in the pores of the anode body, and LC characteristics are improved as well.

MODE FOR CARRYING OUT INVENTION

Figure 1:
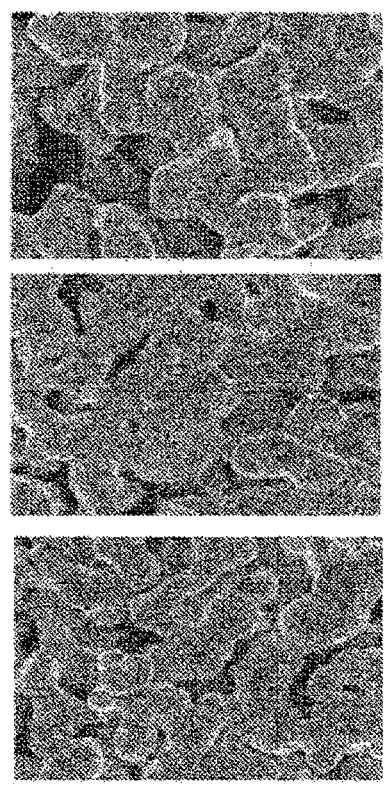
FIG. 1 is a scanning electron microscope (SEM) photo for showing arbitrary three regions (5.6 μm×3.7 μm) on the outer surface of the anode body subjected to chemical conversion treatment in Example 3.

The tungsten electrolytic capacitor of the present invention is manufactured by, for example, the production processes as described below.
(1) A process of preparing a powder, in which metal tungsten is obtained from a tungsten compound and is powdered.
(2) A forming process to obtain a formed body by forming a tungsten powder into a desired shape such as a rectangular parallelepiped and a cylinder.
(3) A sintering process to obtain a sintered body (anode body) by sintering the formed body at a high temperature under high vacuum.
(4) An etching process to leave the natural oxide film on the surface of the anode body slightly by etching.
(5) A chemical conversion treatment process to form a tungsten oxide film on the surface layer of the anode body as a dielectric layer.
(6) A process of forming a semiconductor layer to coat the outer surface and the surface inside the pores of the anode body with a semiconductor layer composed of a conductive polymer.
(7) A process for forming a conductor layer to coat the surface of the semiconductor layer with a conductor layer.

Each of the above production processes is described in details below.

(1) Process of Preparing Powder

A commercially available tungsten powder can be used as a tungsten powder serving as a material of the anode body (minimum particle size: around 0.5 μm). A tungsten powder having a smaller particle diameter which is not commercially available can be obtained, for example, by pulverizing the tungsten trioxide powder under hydrogen atmosphere or by reducing the tungsten acid and halogenated tungsten using a reducing agent such as hydrogen and sodium and appropriately selecting the reducing conditions.

Also, the tungsten powder can be obtained by reducing the tungsten-containing mineral directly or through several steps and by selecting the reducing conditions.

As a powder for an electrolytic capacitor, a granulated tungsten powder (hereinafter, the granulated tungsten powder may be referred to as the "granulated powder") facilitates formation of fine pores in an anode body and is preferable.

Using each of the above-described ungranulated tungsten powders (hereinafter may be referred to as the "primary powder"), the granulated powder further may be the one in which the fine pore distribution is adjusted in the manner as JP-A-2003-213302 discloses on the case of a niobium powder.

A tungsten powder suitable as a raw material can be obtained, by pulverizing the tungsten trioxide powder under hydrogen atmosphere using a pulverizing media (The raw material tungsten powder may be referred to as "a coarse powder" in a simple term). As the pulverizing media, a pulverizing media made of the metal carbide such as tungsten carbide and titanium carbide is preferable. In the case of using these metal carbides, fine fragments of the pulverizing media is less likely to be mixed into the powder. Preferred is a pulverizing media made of tungsten carbide.

As a tungsten powder, the one disclosed by Patent Document 1, only the particle surface region of which is made to be tungsten silicide so as to make the silicon content within a specific range, can be suitably used.

The tungsten powder, in which the particle surface region is silicified, can be obtained by, for example, mixing the silicon powder well into the tungsten powder and allowing the mixture to react by heating under reduced pressure. In the case of using this method, the silicon powder reacts with the tungsten from the surface of the tungsten particles and tungsten silicide such as $W_5Si_3$ is formed and localized generally in a region within 50 nm from the surface layer of the tungsten particles. Hence, the core of the primary particles remains as a highly-conducting metal, which suppresses the equal serial resistance of the anode body produced using the tungsten powder, which is preferable. The tungsten silicide content can be adjusted by the silicon amount to be added. As for any kinds of tungsten silicides, when the silicon content is used as an index for the tungsten silicide content, the silicon content of the whole tungsten powder of the present invention is preferably 0.05 to 7 mass %, and particularly preferably 0.2 to 4 mass %. The tungsten powder containing silicon within the above-mentioned range is a preferable powder for use in the electrolytic capacitors, imparting good LC characteristics to the capacitors. When the silicon content is less than 0.05 mass %, the powder is not capable of imparting good LC characteristics to the capacitors in some cases. When the silicon content exceeds 7.0 mass %, the tungsten powder contains too much tungsten silicide and fails to form a dielectric layer well in some cases when a sintered body obtained by sintering the powder is processed as an anode body by chemical formation.

When the above-mentioned low-pressure condition is set to $10^{-1}$ Pa or lower, preferably $10^{-3}$ Pa or lower, to perform silicification, the oxygen content of the whole tungsten powder can be configured to a preferable range of 0.05 to 8.0 mass %.

The reaction temperature is preferably 1,100° C. or higher and 2,600° C. or lower. The smaller the particle diameter of the silicon to be used, the silicification can be carried out at a lower temperature. However, when the reaction temperature is lower than 1,100° C., it takes time for silicification. When the reaction temperature exceeds 2,600° C., the silicon comes to evaporate easily and is likely to be alloyed with the electrode metal (such as molybdenum), which causes a problem such that the electrode becomes fragile in some cases.

As the tungsten powder used in the present invention, a tungsten powder which further contains at least one member selected from tungsten silicide, tungsten carbide, tungsten boride, and tungsten containing nitrogen solid solution, only in the particle surface region can be suitably used. It is to be noted that in tungsten containing nitrogen solid solution in the present invention, the entire nitrogen needs not be contained in tungsten as a nitrogen solid solution, but part of nitrogen may exist as tungsten nitride or as adsorbed nitrogen on the particle surface.

As an example of the method for allowing a nitrogen solid solution to be contained in the particle surface region of a tungsten powder, there is a method of placing the tungsten powder under a nitrogen atmosphere at 350 to 1,500° C. under reduced pressure for from several minutes to several hours.

A step of incorporating a nitrogen solid solution may be conducted at the time of the high-temperature treatment under reduced pressure for silicifying the tungsten powder, or conducted prior to the step of silicification. Further, the step of incorporating a nitrogen solid solution can be conducted at the time of producing a primary powder, after the production of a granulated powder, or after the production of a sintered body. Thus, it is not specified when the step of incorporating a nitrogen solid solution is conducted during the production process of a tungsten powder, but it is preferable to allow the tungsten powder to have a nitrogen content of 0.01 to 1.0 mass % in an early stage of the production process. The treatment of incorporating a nitrogen solid solution can prevent excessive oxidation of the powder when the powder is handled in air.

As an example of the method of carbonizing part of the surface of a tungsten powder in which the particle surface region is silicified and/or contains a nitrogen solid solution, there is a method of placing the tungsten powders at 300 to 1,500° C. under reduced pressure in a high temperature vacuum furnace using carbon electrodes for from several minutes to several hours. The carbonization is conducted so as to adjust the carbon content in the whole tungsten powder to 0.001 to 0.50 mass % by selecting the temperature and period of time. The time when the carbonization is conducted during the production process is not particularly limited as in the above-mentioned treatment of incorporating a nitrogen solid solution. When a silicified tungsten powder is retained in the furnace with carbon electrodes, in which furnace a nitrogen gas is introduced, under predetermined conditions, carbonization and incorporation of a nitrogen solid solution can be conducted simultaneously, which enables the production of a tungsten powder in which the particle surface region is silicified, carbonized and contains a nitrogen solid solution.

As an example of the method for boronizing part of the surface of a tungsten powder, in which the particle surface region is silicified, carbonized and/or contains a nitrogen solid solution, there is a method of mixing the boron element or a boron-containing compound as a boron source with a tungsten powder in advance and granulating the resultant. It is preferable to conduct the boronizing so that the boron content may be preferably 0.001 to 0.10 mass %. Good LC characteristics can be attained when the boron content is within the above-mentioned range. The time when the boronizing is conducted during the production process is not limited as in the above-mentioned treatment of incorporating a nitrogen solid solution. When a powder in which the particle surface region is silicified and/or contains a nitrogen solid solution, is put into a furnace having carbon electrodes, with a boron source placed in the furnace, mixed with a boron source and is granulated, it is possible to produce a tungsten powder in which the particle surface region is silicified, carbonized, boronized and contains a nitrogen solid solution. When the boronizing is conducted so as to incorporate boron in a predetermined amount, the LC characteristics are further improved in some cases.

At least one member of a tungsten powder containing a nitrogen solid solution, a carbonated tungsten powder and a boronized tungsten powder may be added to the tungsten powder in which the particle surface region is silicified. In this case, it is also preferable to blend each element of silicon, nitrogen, carbon and boron in an amount so that the each content satisfies the above-mentioned range.

The above-mentioned methods for incorporation of a nitrogen solid solution, carbonization, and boronization are explained for the case using the tungsten powder in which the particle surface region is silicified in advance. It is also possible to subject the tungsten powder to at least one of incorporation of a nitrogen solid solution, carbonization and boronization in advance and silicify the surface region of the tungsten powder. A powder of simple tungsten may be mixed with the tungsten powder obtained by subjecting a tungsten powder in which the particle surface region is silicified to at least one of incorporation of a nitrogen solid solution, carbonization and boronization. In this case each element of silicon, nitrogen, carbon and boron is preferably blended in an amount so that the each content satisfies the above-mentioned range.

The oxygen content of the whole tungsten powder of the present invention is preferably 0.05 to 8.0 mass %, and more preferably 0.08 to 1.0 mass %.

As a method for controlling the oxygen content to 0.05 to 8.0 mass %, there is a method of oxidizing the surface of the tungsten powder in which the particle surface region is silicified and further subjected to at least one of incorporation of a nitrogen solid solution, carbonization and boronization. Specifically, nitrogen gas containing oxygen gas is introduced at the time of taking out the powder from a high temperature vacuum furnace at the time of producing a primary powder or a granulated powder of each powder. In case that the temperature at the time of taking out from the high temperature vacuum furnace is lower than 280° C., oxidation takes priority over nitridation. By feeding the gas gradually, a predetermined oxygen content can be obtained. By making each of the tungsten powders have a predetermined oxygen content in advance, it is possible to reduce the deterioration due to the irregular excessive oxidation during the subsequent processes for producing anode bodies for electrolytic capacitors using the powder. In case that the oxygen content is within the above-mentioned range, the LC characteristics of the produced electrolytic capacitors can be kept better. In the case when the incorporation of a nitrogen solid solution is not performed in this process, an inert gas such as argon and helium may be used instead of the nitrogen gas.

The phosphorus element content in the whole tungsten powder of the present invention is preferably from 0.0001 to 0.050 mass %.

As an example of the methods for incorporating the phosphorus element in an amount of from 0.0001 to 0.050 mass % in the tungsten powder, in which the particle surface region is silicified, and further at least one of incorporation of a nitrogen solid solution, carbonization, boronizing, and oxidation is conducted in the surface region, there is a method of producing a powder containing phosphorus by placing phosphorus or a phosphorus compound as a phosphorus source in a high temperature vacuum furnace at the time of producing a primary powder or a granulated powder of each tungsten powder. When phosphorus is incorporated in the tungsten powder so that the content falls within the above-mentioned range by controlling the amount of the phosphorus source and the like, the physical breakdown strength of the anode bodies produced thereof can be improved in some cases. When the phosphorus content falls within the range, LC characteristics of the manufactured electrolytic capacitor are further improved.

The tungsten powder of the present invention mainly comprises tungsten and preferably contains the above-mentioned silicon, nitrogen, carbon, boron, oxygen and phosphorus. The tungsten powder mainly comprising tungsten of the present invention contains 80.0 mass % or more of tungsten to the mass of the whole tungsten powder before the formation of the powder.

To attain better LC characteristics in the tungsten powder in which the particle surface region is silicified, it is preferable to keep the total content of impurity elements other than each element of silicon, nitrogen, carbon, boron, oxygen and phosphorus in the powder to 0.1 mass % or less. In order to keep the content of these elements to the above-mentioned value or lower, the amount of the impurity elements contained in the raw materials, a pulverizing member to be used, containers and the like should be kept low.

(2) Formation Process

Next, the above-mentioned tungsten powder is formed in a shape of the anode body (a shape such as a rectangular parallelepiped and a cylinder). For example, a formed body can be manufactured by mixing resin for formation (acrylic resin and the like) with a tungsten powder and using a forming machine. A tungsten powder to be formed may be either of a primary powder, a granulated powder, or a mixed powder of a primary powder and a granulated powder (a partially-granulated powder). When a granulated powder is used in a larger amount, the average pore diameter in the sintered body to be described later tends to become larger, and when a primary powder is used in a large amount, the average pore diameter tends to become smaller. In addition, by controlling the formation pressure, the fine pore rate in the sintered body can be adjusted. Here, an anode lead wire is embedded in a tungsten powder in advance and is formed so that the anode lead wire is to be drawn out of one end face of the formed body.

(3) Sintering Process

Next, the obtained formed body is sintered in vacuum to obtain a sintered body. A porous body is formed, in which the space between the particles of the primary powder or a granulated powder turns into fine pores by the sintering, and the specific surface area increases. As preferable sintering conditions, sintering is conducted under reduced pressure of $10^2$ Pa or less at a sintering temperature of 1,300 to 2,000° C., preferably 1,300 to 1,700° C., more preferably 1,400 to 1,600° C. Preferred sintering time is 10 to 50 minutes, more preferably 15 to 30 minutes.

(4) Etching Process

In the present invention, an etching treatment is conducted before forming a dielectric layer by chemical conversion treatment on the surface layer of a sintered body (anode body) obtained by sintering each of the above-mentioned various tungsten powders, to remove part of the natural oxide film formed on the surface layer of the anode body. The thickness of the natural oxide film of a tungsten anode body is larger in the outer surface than in the surface inside the pores of the anode body. In the etching process, the natural oxide film is removed so as to adjust the film thickness on the outer surface of the anode body near to that on the surface inside the pores. That is, in the etching process of the present invention, the natural oxide film formed on the outer surface and surface inside the pores of an anode body is removed so as to adjust the film thickness to a range of 0.5 to 5.0 nm. For this purpose, an alkaline solution is used as an etching solution, and the anode body is brought into contact with the alkaline solution to conduct etching without passing current. It is to be noted that if the anode body is immersed in an alkaline solution and current is allowed to pass through, the natural oxide film on the outer surface of the anode body and the one on the surface inside the pores of the anode body are to be equally removed. As a result, the natural oxide film on the surface inside the pores is dissipated earlier and it is not possible to leave the natural oxide film to have the same thickness on the outer surface and on the surface inside the pores. In contrast, when a current is not passed, the natural oxide film is more likely to be removed on the outer surface the anode body than the one on the surface inside the pores. Thus, it is possible to leave the natural oxide film to have the same thickness on the outer surface and on the surface inside the pores.

As the alkaline solution, it is desirable to use an aqueous solution containing at least one member selected from an alkali metal hydroxide, ammonium and quaternary amine. Among these, sodium hydroxide and potassium hydroxide are preferable in that they are easy to handle.

The solvent of the alkaline solution needs to contain water, and only water, or a mixed solvent of water and a water-soluble organic solvent is used. Specific examples of the mixed solvent include a mixed solvent of water and monovalent alcohol or bivalent alcohol such as methanol, ethanol, propanol, ethylene glycol and propylene glycol.

The method for bringing the anode body into contact with an alkaline etching solution is not particularly limited, and examples thereof include immersing, spreading (spraying) and brushing. Among these, spreading (spraying) and brushing are preferable.

As an alkaline etching solution, an aqueous solution of 0.05 to 5 mass % of sodium hydroxide is preferable. This etching solution is to be deposited in an amount of 1 to 30 mass % to the total mass of the anode body by spraying, brushing and the like. Next, the anode body having the alkaline etching solution deposited thereon is left to stand at a temperature of the boiling point of the solvent, preferably at room temperature, for 30 minutes to 20 hours.

After the treatment with the alkaline solution, the anode body is washed with pure water and the like to remove the residual alkaline solution. Next, the anode body is dried by natural drying or circulation drying.

The thickness of the natural oxide film after the etching is determined by observing the section of a resin-embedded sample of the anode body under a scanning electron microscope (SEM; magnification: 100,000 to 1,000,000 times). It is to be noted that the thickness that appears in the SEM photo of the section is an apparent thickness, and is not necessarily a thickness vertical to the film surface. Therefore, it is desirable to take the average of the values obtained by observing multiple points.

The thickness of the natural oxide film before the etching treatment and the thickness of the dielectric layer after the chemical conversion treatment to be described later can be determined by the same method.

(5) Chemical Conversion Process

Next, a dielectric layer is formed by chemical conversion treatment on the surface layer of the anode body after the etching treatment. The chemical conversion treatment is conducted under the following conditions.

As a chemical conversion liquid of the chemical conversion treatment, an aqueous solution containing an oxidizing agent is used. The oxidizing agent used here is an oxygen-containing compound that is susceptible to reduction per se. Examples of the preferred oxidizing agent include at least one member selected from the group consisting of a manganese(VII) compound, a chromium(VI) compound, a halogen acid compound, a persulfate compound and organic peroxide. Specific examples include a manganese(VII) compound such as permanganate; a chromium(VI) compound such as chrome trioxide, chromate and dichromate; a halogen acid compound such as perchloric acid, chlorous acid, hypochlorous acid and salts thereof; organic acid peroxide such as acetyl hydroperoxide and perbenzoic acid, and salts and derivatives thereof; a persulfuric acid compound such as persulfate and salts thereof. Among these, persulfate such as ammonium persulfate, potassium persulfate, potassium hydrogen persulfate are preferable from the viewpoint of handleability, stability as an oxidizing agent, high solubility in water, and capacity-increasing performance. These oxidizing agents can be used solely or in combination of two or more thereof.

The content of the oxidizing agent is preferably 0.05 to 12 mass %, more preferably 0.05 to 7 mass %, still more preferably 1 to 5 mass %. When the content of the oxidizing agent is too low, it becomes less effective. When the content of the oxidizing agent is too high, elements without a high capacitance arise in some cases, and a longer time is required for washing the chemical conversion liquid after the chemical conversion treatment.

The chemical conversion temperature is to be described later. The chemical conversion liquid may contain a known electrolyte within a scope which does not affect the effect of the present invention. Examples of the electrolyte include acid such as nitric acid, sulfuric acid, boric acid, oxalic acid, adipic acid and phosphoric acid; or alkali metal salts and ammonium salts of these acids. If the electrolyte is contained in the chemical conversion liquid in excessive quantities, protrusions and elongated protrusions are generated on the surface of the dielectric layer and impair the smoothness of the dielectric layer in some cases.

The chemical conversion treatment using a chemical conversion liquid containing an oxidizing agent may be repeated multiple times. In addition, before or after the chemical conversion treatment using a chemical conversion liquid containing an oxidizing agent, chemical conversion treatment using a chemical conversion liquid containing an electrolyte may be conducted as needed. However, in a method of conducting the chemical conversion treatment using a chemical conversion liquid containing an oxidizing agent and the chemical conversion treatment using a chemical conversion liquid containing an electrolyte in combination, there is possibility that the chemical conversion liquids are mixed with each other, leading to deterioration of the both liquids. Therefore, a longer period of time may be required for water washing after the chemical conversion to prevent the problem.

The chemical conversion treatment is conducted by immersing the anode body, in which part of the natural oxide film on the surface layer was removed, in the above-mentioned chemical conversion liquid and applying voltage thereto. The voltage is applied between the anode body (anode) and the counter electrode (cathode). Current can be passed through the anode body through the anode lead wire.

The application of voltage is started at a predetermined initial current density; the current density is maintained until the voltage reaches a predetermined voltage (chemical formation voltage); and after that it is desirable to maintain the voltage value. The chemical formation voltage can be appropriately configured depending on a predetermined withstand voltage.

When the thickness of the dielectric layer is represented by t (unit: nm) and the chemical formation voltage is represented by E (unit: V), it is desirable that they have a relation of $t \geq 2E$ to attain enough practical LC characteristics. In addition, a dielectric layer is formed more readily and has a larger thickness on the outer surface of the anode body than in the center portion (surface inside the pores) of the anode body. Therefore, it is necessary to conduct chemical conversion treatment to avoid cracks in the dielectric layer particularly on the outer surface of the anode body.

In order to attain the above-mentioned preferable thickness of the dielectric layer, it is critical to conduct chemical formation treatment at a temperature of −4 to 18° C. and for 7 to 110 minutes after the voltage reaches a predetermined value. If the chemical formation treatment temperature is lower than −4° C. or the chemical formation treatment time is less than 7 minutes, no crack is observed in the outer surface layer but LC characteristics are poor in some cases because the internal dielectric layer is too thin. That is, it is presumed that under such conditions the thickness of the dielectric layer in the center portion (surface inside the pores) of the anode body is less than the above-mentioned 2E (nm), resulting in a low withstand voltage. On the other hand, when the chemical conversion treatment temperature exceeds 18° C. or the chemical formation conversion treatment time exceeds 110 minutes, the dielectric layer on the outer surface of the anode body becomes too thick and cracks are generated, leading to decrease in the capacitance.

After the chemical conversion treatment, the chemical conversion liquid is to be removed as much as possible by washing the anode body with pure water. After washing with water, it is desirable to remove water attached on the surface or permeated in the fine pores of the anode body at a temperature lower than the boiling point of water under the pressure at the time of removal. Water is removed by, for example, bringing water into contact with a water-miscible solvent (propanol, ethanol, methanol and the like), followed by drying by heating.

(6) Process for Forming a Semiconductor Layer

A cathode is formed on the anode body subjected to the chemical conversion treatment obtained by the above-mentioned method. The cathode is composed of a semiconductor layer (referred to as a "true cathode") that is formed in direct contact with a dielectric layer; and an electrode layer (referred to as an "apparent cathode") that is used for the connection with the outside. As a semiconductor layer, an inorganic or organic semiconductor layer is used. Examples of the inorganic semiconductor layer include a manganese dioxide layer. Examples of the organic semiconductor layer include a conductive polymer layer such as a layer comprising polypyrrole or a derivative thereof, a layer comprising polythiophene or a derivative thereof (for example, polymer of 3,4-ethylenedioxythiophene), and a layer comprising polyaniline or a derivative thereof. A dopant is doped to these conductive polymers. A semiconductor layer made of a conductive polymer is particularly preferable because a low ESR can be attained due to high conductivity of the semiconductor layer. The semiconductor layer is formed by a chemical synthesis method (solution reaction, gas-phase reaction, solid-liquid reaction, and combination thereof), an electrochemical synthesis method (electrolytic polymerization method), or a combination of these methods. Here, if the semiconductor layer is produced by an electrolytic polymerization method at least once, it is preferable because the resultant capacitor element has a lower initial ESR value compared to those using a semiconductor layer produced by another method.

(7) Process for Forming a Conductor Layer

A conductor layer is provided on the semiconductor layer formed by the above-mentioned method and the like. A conductor layer can be formed by, for example, solidifying a conductive paste, plating, metal deposition, depositing a heat-resistant conductive resin film, and the like. As a conductive paste, a silver paste, a copper paste, an aluminum paste, a carbon paste, a nickel paste and the like are preferred. One kind or two or more kinds of these pastes may be used. When two or more kinds are used, they may be mixed or may be laminated in two separate layers. After applying the conductive paste, it is to be solidified by leaving it to stand in air or by heating. Examples of plating include nickel plating, copper plating, silver plating and aluminum plating. Examples of evaporated metal include aluminum, nickel, copper and silver.

Specifically, for example, a carbon paste and a silver paste are sequentially laminated on the semiconductor layer to thereby form a conductor layer.

Thus, a semiconductor layer and a conductor layer are sequentially laminated as a cathode on the anode body having a dielectric layer formed thereon to thereby fabricate a tungsten electrolytic capacitor element.

A cathode lead is electrically connected to the above-mentioned cathode, and a part of the cathode lead is exposed outside the outer jacket of the electrolytic capacitor to serve as a cathode external terminal. On the other hand, an anode lead is electrically connected to the anode body through an anode lead wire, and a part of the anode lead is exposed outside the outer jacket of the electrolytic capacitor to serve as an anode external terminal. Next, an outer jacket is formed by encapsulation with resin and the like to obtain a capacitor product.

EXAMPLES

The present invention is described below by referring to Examples and Comparative Examples, but the present invention is not limited thereto.

In the present invention, the measurement of the particle diameter (average particle diameter and particle diameter range), the bulk density, the specific surface area and elemental analysis were carried out by the methods described below.

The volume-average particle diameter was measured by using HRA9320-X100 (laser diffraction/scattering method particle size analyzer) manufactured by Microtrac Inc. Specifically, a volume-based particle size distribution was measured by the equipment. A particle size value ($D_{50}$; μm) when the accumulated volume % corresponded to 50 volume % in the particle size distribution was designated as the volume-average particle size. The diameter of the secondary particles is to be measured by this method. However, since a coarse powder generally has good dispersibility, the average particle diameter of the coarse powder measured by the above measuring equipment can be regarded almost as a volume-average primary particle diameter.

The bulk density was measured by weighing out 100 ml ($cm^3$) with a measuring cylinder and measuring the mass thereof.

The specific surface area was measured by the BET method (adsorbed gas: nitrogen) by using NOVA2000E (manufactured by SYSMEX).

For the elemental analysis, ICP emission spectrometry was performed by using ICPS-8000E (manufactured by Shimadzu Corporation).

Examples 1 to 5

By reducing a tungsten trioxide powder having an average particle diameter of 10 to 120 μm with hydrogen, a tungsten powder was produced, wherein a number of fine voids are provided inside and fine powder particles having an average particle size of 0.1 μm were three-dimensionally joined with each other. The tungsten powder had an average particle diameter of 4 to 110 μm. After mixing 0.3 mass % of silicon with the powder, 0.2 mass % of phosphoric acid dissolved in water was added thereto and fully mixed. Then the mixture was dried at 140° C. for five hours in a vacuum dryer to remove water. Next, the resultant was left to stand in a vacuum dryer at 1,300° C. for 30 minutes. After returning the obtained aggregated product to room temperature, it was washed with water and then dried at 140° C. for five hours in a vacuum dryer to remove water. Next, the aggregated product was crashed, and part of the obtained powder having a particle diameter of 26 to 180 μm was classified with a sieve to be used for the operations set forth below. The powder had a bulk density of 5.8 $g/cm^3$ and a BET specific surface area of 4.2 $m^2/g$. Next, the powder was formed so as to allow a tantalum lead wire having a diameter of 0.24 mm to be implanted, and sintered in vacuum at 1,400° C. for 20 minutes to obtain 1,000 pieces of anode bodies having a size of 1.0×2.3×1.7 mm (a lead wire is implanted in the center of the 1.0×2.3 mm surface. Powder mass: 32 mg). Next, after storing the anode body in a desiccator at 25° C. and 40% RH for 95 days, etching treatment was conducted with an alkaline solution as described below. That is, after spreading a separately-prepared aqueous solution of 0.5 mass % of sodium hydroxide with an atomizer on the surface of the anode body and leaving the anode body to stand for the etching treatment time period as shown in Table 1, the anode body was washed with water, dried in vacuum at 125° C. and then taken out from the dryer. By observing the section of a resin-embedded anode body sample under a scanning electron microscope (SEM), it was confirmed that the natural oxide film of the anode body had a thickness of 0.5 to 3.5 nm both inside (on the surface inside the pores) and on the outer surface of the anode body. Before the etching treatment, the natural oxide film of the anode body had a thickness of 28 nm inside (on the surface inside the pores) and 45 nm on the outer surface of the anode body. Subsequently, using an aqueous solution of 3 mass % of ammonium persulfate as an electrolyte, the anode body and a part of the lead wire were immersed in the electrolyte and subjected to chemical conversion treatment under the conditions of an initial current density of 2 mA/anode body, a chemical conversion voltage of 10 V, the chemical conversion temperature and the chemical conversion time (time after reaching the conversion voltage) as shown in Table 1, by connecting the lead wire to the positive electrode of the power source and connecting the stainless plate in the electrolyte to the negative electrode of the power source, to thereby form a dielectric layer comprising amorphous tungsten trioxide on the anode body and a part of the lead wire. In the case where the chemical conversion temperature is 0° C. or less, 10 mass % of ethyl alcohol was incorporated in the electrolyte to prevent solidification of the electrolyte. After washing the anode body with water, water was promptly substituted with ethyl alcohol and the anode body was dried at 190° C. for 15 minutes. After returning the anode body to room temperature, a separately-prepared aqueous solution of 50 mass % sulfuric acid was used as an electrolyte, and the anode body subjected to chemical conversion treatment was immersed in the electrolyte. The lead wire was connected to the positive electrode of the power source and the platinum plate located in the electrolyte was connected to the negative electrode of the power source, and the LC value was measured 30 seconds after applying a voltage of 10 V, which was equal to the chemical conversion voltage, at 23° C. In addition, the anode body subjected to the chemical conversion treatment was immersed in the electrolyte, and an inductance-capacitance-resistance (LCR) meter was connected thereto to measure the capacitance under the conditions of room temperature, a frequency of 120 Hz, and a bias voltage of 2.5 V. The results of the measurement of these LC values and the capacitance (both are expressed by an average value of 64 elements) are shown in Table 1. In addition, the thickness of the dielectric body in the center of the anode body subjected to chemical conversion treatment in each of Examples was determined by observing the section of the resin-embedded sample of the anode body under the scanning electron microscope (SEM). The average values of ten measured samples are also shown in Table 1.

Comparative Examples 1 to 4

The anode bodies subjected to chemical conversion treatment in Comparative Examples 1 to 4 were produced in the same way as in Example 1 except that the conditions were set to the etching treatment time, the chemical conversion temperature and the chemical conversion time as shown in Table 1.

Comparative Example 5

The anode bodies subjected to chemical conversion treatment in Comparative Example 5 were produced in the same way as in Example 1 except that the etching treatment was conducted while a current is allowed to pass, and that the conditions were set to the chemical conversion temperature and the chemical conversion time as shown in Table 1. Here, the current was allowed to pass as described below. By using an aqueous solution of 0.1 mass % of sodium hydroxide as an alkaline solution, the anode body was immersed in the alkaline solution to the predetermined depth. Current was allowed to pass between the anode body as a positive electrode and the platinum plate located in the alkaline solution as a negative electrode. The current was passed for 15 minutes under the energization conditions of room temperature, a voltage of 2.5 V and a current density of 1 mA/piece.

Comparative Example 6

The anode bodies subjected to chemical conversion treatment in Comparative Example 6 were produced in the same way as in Example 1 except that the etching treatment was not conducted.

The anode bodies in Comparative Examples 1 to 6 were measured for the film thickness of the dielectric layer in the center of the anode body, the capacitance and the LC value in the same way as in Example 1. These results are shown in Table 1. It is to be noted that when the outer surface of the anode bodies subjected to chemical conversion treatment was observed under a scanning electron microscope, cracks were found in the outer surface of the anode bodies subjected to chemical conversion of Comparative Examples 4 and 6.

TABLE 1

|  | Etching treatment time (hr) | Thickness of natural oxide film after treatment (nm) | Chemical conversion treatment temperature (° C.) | Chemical conversion treatment time (min.) | Thickness of dielectric layer in center portion (nm) | Capacitance (μF) | LC (μA) |
| --- | --- | --- | --- | --- | --- | --- | --- |
| Example 1 | 10 | 0.5 to 3.5 | −3 | 10 | 21 | 347 | 42 |
| Example 2 |  |  | −3 | 100 | 27 | 323 | 37 |
| Example 3 |  |  | 5 | 30 | 28 | 319 | 41 |
| Example 4 | 6 | 1 to 5 | −3 | 10 | 28 | 325 | 44 |
| Example 5 |  |  | −3 | 100 | 25 | 317 | 40 |
| Comparative Example 1 | 4 | 6 to 12 | −3 | 10 | 31 | 330 | 154 |
| Comparative Example 2 |  |  | −3 | 100 | 30 | 329 | 179 |

TABLE 1-continued

|  | Etching treatment time (hr) | Thickness of natural oxide film after treatment (nm) | Chemical conversion treatment temperature (° C.) | Chemical conversion treatment time (min.) | Thickness of dielectric layer in center portion (nm) | Capacitance (μF) | LC (μA) |
| --- | --- | --- | --- | --- | --- | --- | --- |
| Comparative Example 3 | 10 | 0.5 to 3.5 | −5 | 10 | 14 | 406 | 658 |
| Comparative Example 4 |  |  | 45 | 120 | 38 | 272 | 45 |
| Comparative Example 5 | 0.25 With energization | 0 | −5 | 10 | 25 | 288 | 53 |
| Comparative Example 6 | N/A | Inside: 28 Outer surface: 45 | −3 | 10 | 35 | N/A | Short circuited |

Examples 6 to 9, Comparative Examples 7 to 14

Figure 2:
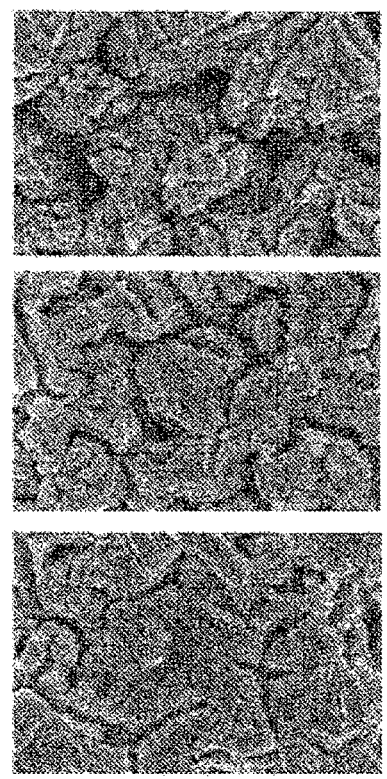
FIG. 2 is a scanning electron microscope (SEM) photo for showing arbitrary three regions (5.6 μm×3.7 μm) on the outer surface of the anode body subjected to chemical conversion treatment in Example 8.

After mixing 0.5 part by mass of a silicon powder with 100 parts by mass of a tungsten powder having an average particle diameter of 0.6 μm and a BET specific surface area of 3.4 m²/g with a roller mixer, the mixture was left to stand in a vacuum heating furnace at 1,420° C. for 30 minutes and returned to room temperature. The aggregated product taken out of the furnace was crashed, and part of the obtained powder having a particle diameter of from 26 to 180 μm was classified with a sieve to be used for the operations as described below. The powder had a bulk density of 3.1 g/cm³ and a BET specific surface area of 2.8 m²/g. Next, the powder was formed so that to allow a tantalum lead wire having a diameter of 0.24 mm to be implanted, and sintered in vacuum at 1,480° C. for 20 minutes to obtain 1,000 pieces of sintered bodies (hereinafter referred to as "anode bodies") having a size of 1.0×2.3×1.7 mm (a lead wire is implanted in the center of the 1.0×2.3 mm surface. Powder mass: 34 mg). Next, after storing the anode body in a desiccator at 25° C. and 40% RH for 60 days, etching treatment was conducted in the same way as in Example 1 except that the etching time was 3 hours. The anode body subjected to the etching treatment was resin-embedded, and the section thereof was observed under a scanning electron microscope (SEM). It was confirmed that the thickness of the natural oxide film of the anode body was 0.5 to 3.5 nm both inside (on the surface inside the pores) and on the outer surface of the anode body. It is to be noted that the thickness of the natural oxide film before the alkali treatment was 23 nm inside (on the surface inside the pores) and 40 nm on the outer surface of the anode body. Subsequently, using an aqueous solution of 2 mass % of potassium persulfate as an electrolyte, the anode body and a part of the lead wire were immersed in the electrolyte and subjected to chemical conversion treatment under the conditions of an initial current density of 3 mA/anode body, a chemical conversion voltage of 15 V, the chemical conversion temperature and the chemical conversion time (time after reaching the conversion voltage) as shown in Table 2, by connecting the lead wire to the positive electrode of the power source and connecting the stainless plate in the electrolyte to the negative electrode of the power source, to thereby form a dielectric layer comprising amorphous tungsten trioxide on the anode body and a part of the lead wire. In the case where the chemical conversion temperature is 0° C. or less, 10 mass % of ethyl alcohol was incorporated in the electrolyte to prevent solidification of the electrolyte. After washing the anode body with water, water was promptly substituted with ethyl alcohol and the anode body was dried at 190° C. for 15 minutes. After returning the anode body to room temperature, a separately-prepared aqueous solution of 50 mass % sulfuric acid was used as an electrolyte, and the anode body subjected to chemical conversion treatment was immersed in the electrolyte. The lead wire was connected to the positive electrode of the power source and the platinum plate located in the electrolyte was connected to the negative electrode of the power source, and the LC value was measured 30 seconds after applying a voltage of 15 V at 23° C. In addition, the anode body subjected to the chemical conversion treatment was immersed in the electrolyte, and an inductance-capacitance-resistance (LCR) meter was connected thereto to measure the capacitance under the conditions of room temperature, a frequency of 120 Hz, and a bias voltage of 2.5 V. The results of the measurement of these LC values and the capacitance (both are expressed by an average value of 64 elements) are shown in Table 2. In addition, the thickness of the dielectric body in the center of the anode body subjected to chemical conversion treatment in each of Examples was determined by observing the section of the resin-embedded sample of the anode body under the scanning electron microscope (SEM). The average values of ten measured samples are also shown in Table 2. Cracks were observed on the outer surface of the anode body in Comparative Examples 8, 10, 13 and 14. The SEM photo of the outer surface of the anode body subjected to chemical conversion treatment in Example 8 (no cracks) and the SEM photo of the outer surface of the anode body subjected to chemical conversion treatment in Comparative Example 10 (with cracks) are shown in FIG. 1 and FIG. 2, respectively (Each of the figures is the photo of three arbitrary points in the visual field of 5.6 μm×3.7 μm).

Table 2

| | Etching treatment time (hr) | Thickness of natural oxide film after treatment (nm) | Chemical conversion treatment temperature (° C.) | Chemical conversion treatment time (min.) | Thickness of dielectric layer in center portion (nm) | Capacitance (μF) | LC (μA) |
|---|---|---|---|---|---|---|---|
| Example 6 | 3 | 0.5 to 3.5 | −3 | 10 | 33 | 92 | 14 |
| Example 7 | | | −3 | 100 | 37 | 87 | 14 |
| Example 8 | | | 15 | 10 | 36 | 90 | 16 |
| Example 9 | | | 15 | 100 | 39 | 87 | 17 |
| Comparative Example 7 | | | −3 | 5 | 23 | 126 | 158 |
| Comparative Example 8 | | | −3 | 120 | 44 | 78 | 16 |
| Comparative Example 9 | | | 15 | 5 | 28 | 108 | 150 |
| Comparative Example 10 | | | 15 | 120 | 45 | 73 | 13 |
| Comparative Example 11 | | | −6 | 10 | 20 | 146 | 259 |
| Comparative Example 12 | | | −6 | 100 | 28 | 110 | 130 |
| Comparative Example 13 | | | 20 | 10 | 44 | 77 | 18 |
| Comparative Example 14 | | | 20 | 100 | 51 | 62 | 12 |

The invention claimed is:

1. A method for producing a capacitor element, wherein, after a chemical conversion process to form a dielectric layer on the surface layer of an anode body obtained by forming a powder mainly comprising tungsten, followed by sintering, a semiconductor layer and a conductor layer are sequentially formed on the dielectric layer; an etching process is conducted before forming the dielectric layer to remove a natural oxide film formed on the surface layer on the outer surface and on the surface inside the pores of the anode body so as to adjust the film thickness to a range of 0.5 to 5.0 nm; and the chemical conversion process is conducted at a temperature from −4 to 18° C. for 7 to 110 minutes after reaching a predetermined voltage.

2. The method for producing a capacitor element as claimed in claim 1, wherein the etching process is conducted by bringing the anode body into contact with an alkaline solution without passing current.

3. The method for producing a capacitor element as claimed in claim 2, wherein the alkali is sodium hydroxide or potassium hydroxide.

4. The method for producing a capacitor element as claimed in claim 2, wherein the alkaline solution is an aqueous solution of sodium hydroxide or potassium hydroxide, or a solution of a mixed solvent of water and an organic solvent.

5. The method for producing a capacitor element as claimed in claim 4, wherein the alkaline solution is an aqueous solution of 0.05 to 5 mass % sodium hydroxide.

6. The method for producing a capacitor element as claimed in claim 2, wherein the anode body is brought into contact with the alkaline solution by spreading (spraying) or brushing.

7. The method for producing a capacitor element as claimed in claim 1, wherein the powder mainly comprising tungsten contains tungsten silicide only in the particle surface region and the silicon content in the whole tungsten powder is 0.05 to 7.0 mass %.

* * * * *